Nov. 15, 1938.　　　F. M. MARTINO　　　2,136,749
BATTERY CONTAINER
Filed March 8, 1937　　　2 Sheets-Sheet 1
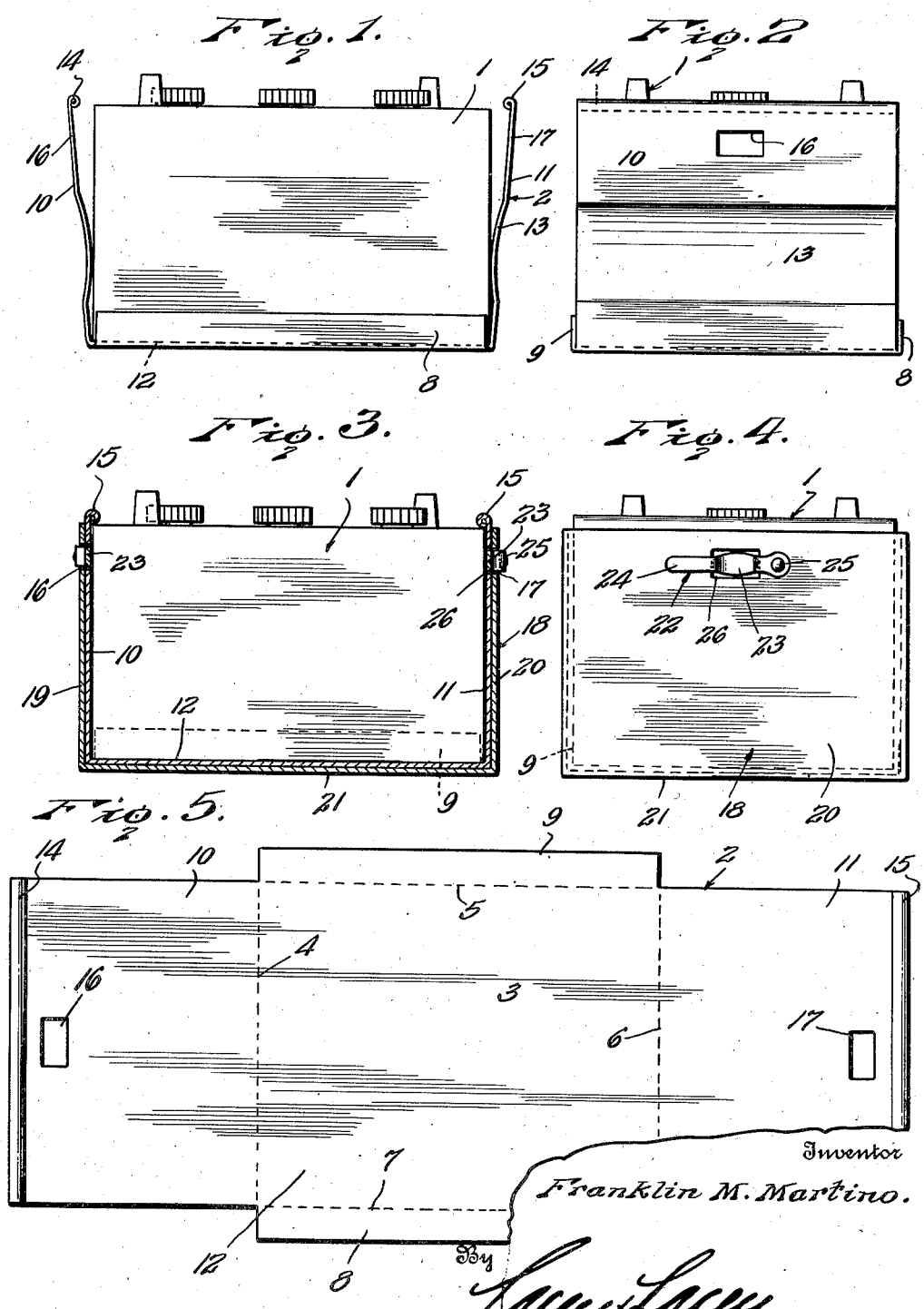

Nov. 15, 1938.    F. M. MARTINO    2,136,749
BATTERY CONTAINER
Filed March 8, 1937    2 Sheets-Sheet 2
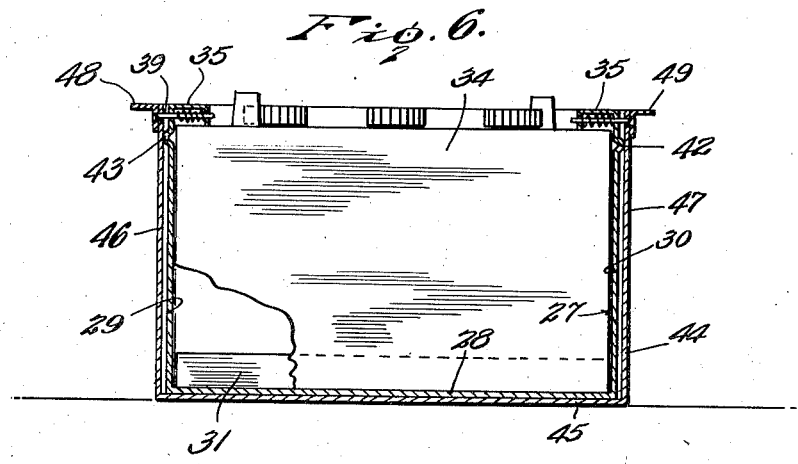
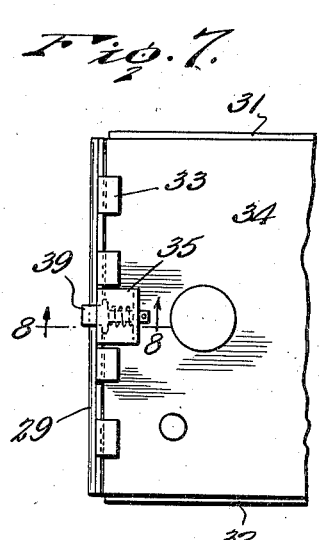
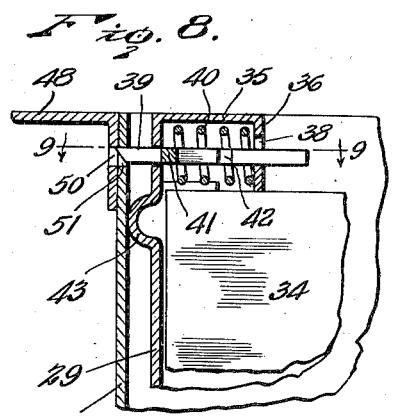
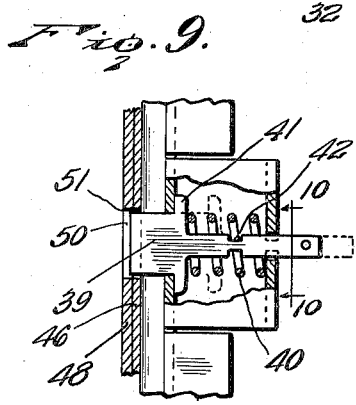
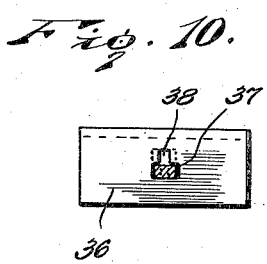
Inventor
Franklin M. Martino.
By Lacey & Lacey
Attorneys Patented Nov. 15, 1938

2,136,749

UNITED STATES PATENT OFFICE 2,136,749

BATTERY CONTAINER

Franklin M. Martino, Vineland, N. J.

Application March 8, 1937, Serial No. 129,725

8 Claims. (Cl. 180—68.5)

This invention relates to an improved battery container and seeks, among other objects, to provide a device of this character which will effectually bind a storage battery, such as is used in automobiles, motor boats, and the like, in operative position and eliminate possible injury thereto such as may be caused by the binding of the cleats ordinarily used for holding the battery in place.

Another object of the invention is to provide a battery container, the use of which will facilitate the installation and removal of a battery so that such installation and removal may be done in the shortest possible time and with the least possible inconvenience.

A further object of the invention is to provide a battery container which will serve to hold a storage battery in operative position irrespective of whether the battery is to be mounted on its side, on its end, or upside down.

The invention seeks as a still further object to provide a battery container which will serve to effectually retain the storage battery therein and prevent movement of the battery by a vehicle when in motion, and which will embody means for retaining said battery in place, said means, however, being engageable for permitting release of the battery and ready withdrawal therefrom the container.

And the invention has as a still further object to provide a battery container which is so constructed that after the battery cables have been disconnected from the battery, said battery may be withdrawn from the container without the use of tools.

Other and incidental objects of the invention not specifically mentioned hereinbefore will render themselves apparent as the description of the invention proceeds.

In the drawings forming a part of my application:

Figure 1 is a side view showing a storage battery installed in the frame of my improved container prior to installation in the housing employed.

Figure 2 is an end view showing the battery installed in the frame.

Figure 3 is a longitudinal sectional view showing the battery mounted in the frame and said frame mounted in the housing employed.

Figure 4 is an end view of the complete battery container with a storage battery therein.

Figure 5 is a plan view, partly broken away, of the blank employed for the making of the frame of my improved battery container, and showing said blank before being bent to define said frame.

Figure 6 is a longitudinal sectional view, partly broken away and showing a modified form of my improved battery container.

Figure 7 is a fragmentary top plan view of this modified form of the invention.

Figure 8 is an enlarged detail vertical sectional view on the line 8—8 of Figure 7, looking in the direction indicated by the arrows.

Figure 9 is an enlarged horizontal detail sectional view on the line 9—9 of Figure 8.

Figure 10 is a detail sectional view on the line 10—10 of Figure 9.

Referring now to the drawings, wherein like numerals of reference will be seen to designate like parts throughout the various views, the numeral 1 indicates a conventional storage battery which may be of any suitable design and which is, of course, preferably rectangular in shape. The storage battery is of the type employed in automobiles, motor boats, and other installations for supplying low voltage high current electricity which is to be used for lighting headlights, cranking internal combustion engines, and for other purposes. At this point, it is desired to emphasize that my improved battery container may be employed not only in movable vehicles but also in any place where it is desired to provide a firm mounting for a storage battery.

In carrying my invention into effect, I employ a frame which is indicated in general by the numeral 2. The frame, as illustrated in Figure 5 of the drawings, comprises a blank 3 which is scored along lines 4, 5, 6 and 7 to define side flanges 8 and 9 and end walls 10 and 11. The blank 3 is made of relatively heavy slightly resilient sheet metal and, as best seen in Figure 1, the side flanges 8 and 9 and the end walls 10 and 11 are bent upwardly to a substantially ninety degree angle with the bottom of the frame, which bottom is indicated at 12. As will be seen in Figure 1, the end walls 10 and 11 of the frame 2 are normally slightly sprung outwardly and, as shown at 13, said end walls are also slightly curved inwardly. The corresponding upper end portions of the walls 10 and 11 are inwardly rolled to define beads 14 and 15. Openings 16 and 17 are formed in the end walls 10 and 11 near their corresponding upper end portions and medially of their width. The openings 16 and 17 are adapted to receive a latch to be described in more detail hereinafter.

As shown in Figure 1 of the drawings, the storage battery is fitted within the frame with the side flanges 8 and 9 abutting the longitudinal sides of the battery near its lower end. The battery will, of course, rest upon the bottom 12. After the battery is fitted in place overlying the bottom 12 and between said flanges 8 and 9, the end walls 10 and 11 are shifted or sprung inwardly for engaging the beads 14 and 15 in overhanging relation to the end edges of the battery. In this position, the beads 14 and 15 will retain the battery against outward movement from the frame. If desired, in lieu of the side flanges 8 and 9, walls extending the full height of the battery and terminating in beads similar to the beads 14 and 15, may be employed. By virtue of the fact that the end walls 10 and 11 are slightly curved inwardly, end play of the battery within the frame will be prevented.

In order to mount the battery and frame in a vehicle or other desired location, I provide a housing 18 which is rectangular in shape and is formed from any suitable material, metal or wood being generally employed. The housing comprises end walls 19 and 20 and a bottom 21, and said housing is of sufficient size to permit ready reception of the battery and the frame 2 therein. As best seen in Figure 3 of the drawings, as the frame with the battery therein is installed in the housing, the end walls 10 and 11 will be automatically urged into close engagement with the end walls of the battery, and the beads 14 and 15 will be caused to overlap the ends of the battery, provided said end walls have not been forced inwardly manually or by a battery installing tool prior to installation of the frame and battery in the housing.

In order to provide means for effecting the retention of the frame and battery in the housing, I provide a latch which is indicated in general by the numeral 22. One of the latches 22 is preferably carried on each end of the housing, although, if desired, but one may be employed. A typical latch includes an inwardly curved bill 23 and a handle portion 24. The latch is secured to an end wall of the housing by means of a rivet 25 which extends through the end of the latch opposite the handle portion 24. The bill 23 of the latch is adapted to extend through a cutaway portion 26 of the housing and normally into the opening 17 of the frame 2. The handle 24 will, of course, prevent too great inward movement of the bill 23 and said handle portion will permit the ready manual engagement of the latch. Outward movement of the handle portion will, of course, remove the bill 23 from the opening 17 and permit withdrawal of the frame from the housing. When two of the latches are employed, one at each end, it will be necessary to manually engage the handle portion of each of the latches or to utilize suitable means for retaining said latches in unlocked position so that the frame may be withdrawn from the housing.

After the frame has been withdrawn from the housing, the end walls 10 and 11 of said frame will spring outwardly, or, if they have become stuck to the battery, may be readily sprung outwardly for freeing the battery from the frame.

A storage battery, when mounted in operative position by the use of my improved battery container as disclosed in Figures 1 to 5 inclusive of the drawings, will be effectually mounted and will be prevented from breakage or damage caused by side or end motion in mounted position.

The invention is extremely simple in construction and embodies few working parts. It may be manufactured cheaply to retail at an attractive figure.

Referring now to the modification of my battery container as disclosed in Figures 6 through 10 inclusive, the numeral 27 indicates in general a frame including a bottom 28 and end walls 29 and 30. Side flanges, similar to the side flanges 8 and 9 of the other form of the invention, are indicated at 31 and 32. The frame 27 is formed of the same material as that employed in the preferred form and the end walls 29 and 30 are provided with laterally directed spaced lugs or fingers 33 adapted to overlap the end portions of the battery, shown at 34. The end walls 29 and 30 are provided at their corresponding upper end edges and medially of their width, with latch housings 35. The latch housings are substantially of inverted U-shape in contour and include inner end walls 36 formed with slots 37, seen best in Figure 10, having narrowed portions 38. The latch housings are identical in construction and further description thereof will refer to a typical housing. Such a typical latch housing includes a latch bolt 39 which is adapted to extend longtudinally of the latch housing and is adapted to project outwardly away from the end wall 29 of the frame 27. A coil spring 40 surrounds the latch bolt 39 and tends to urge it forwardly or outwardly. The rear end of the spring 40 engages the inner surface of the wall 36 of the latch housing. The latch bolt 39 is relatively wide at its forward end and includes stepped portions 41 which also provide an abutment for the inner end of the coil spring 40. A notch 42 is cut into the opposite sides of the bolt 39, medially of its length, and said notch is, at withdrawal of the latch bolt 39, adapted to engage in the narrowed portion 38 of the slot 37 for retaining the latch bolt in retracted position when the rear end portion of said bolt is raised slightly for engaging said notches in said narrowed portion. Below the latch casing 35 and at the junction thereof with the end wall 29, said end wall is slightly bowed outwardly, as indicated at 43, for a purpose to be described hereinafter.

The frame 27 is adapted to be installed in a housing 44, which may be formed of metal or any other suitable material, and which is adapted to be rigidly mounted in a suitable place on a vehicle or other place where it is desired to install a storage battery. The housing 44 includes a bottom 45 and end walls 46 and 47. The curved portions 42 and 43 of the end walls 29 and 30, will be caused to engage the upper end portions of the end walls 46 and 47 of the housing 44 so that said end walls 29 and 30 will be closely engaged with the ends of the storage battery 34 and the fingers 33 will be in overhanging relation to said end walls of the battery. The latch housings 35 will, of course, also be in overhanging relation to the end portions of the battery medially thereof. The upper end portions of the walls 46 and 47 are provided with mounting flanges 48 and 49 and said mounting flanges are provided with laterally presented openings 50 which are in alinement with openings 51 formed in the end walls 46 and 47 of the container 44, near their upper corresponding ends. The openings 50 and 51 are adapted to removably receive the latch bolt 39 of the latch 35 when said latch bolt is projected.

When the latch bolts 39 of the latches 35 are in engagement with the openings 50 and 51 of the end walls 46 and 47, the frame 27 will be effectualy mounted in the housing 44 and the battery, which is mounted in the frame 27, will also be effectually mounted within the housing. Withdrawal of the latch bolts will, of course, permit ready removal of the frame 27 from the housing 44 and consequent ready withdrawal of the battery 34 from said frame 27.

As in the preferred form of the invention, the battery will be effectually mounted and will be prevented from lateral endwise movement so that breakage thereof will be prevented. It will be seen that the inventive concept of this form of the invention is identical with that of the preferred form and differs therefrom only in the above mentioned details.

It is believed that from a reading of the foregoing, it will be understood that the construction and operation of my improved battery container will be thoroughly understood.

Having thus described the invention, what I claim is:

1. In a battery container, a frame formed from a single blank of sheet metal bent to form end walls and a bottom, said frame being adapted to receive a storage battery and said end walls being engageable with the battery for retaining said battery in place in the frame, and a housing adapted to receive the frame and battery and having end walls engageable with said first mentioned end walls for retaining the frame in position about the battery whereby said battery will be mounted in operative position.

2. In a battery container, a frame having a bottom, end walls and side flanges and being adapted to receive a storage battery therein, said end walls having beads adapted to overlap the end walls of the battery for limiting outward movement of said battery from the frame, and a housing adapted to receive the frame and battery and automatically urge the end walls of said frame inwardly into engagement with the battery whereby said battery will be mounted in an operative position.

3. In a battery container, a frame having end walls, said frame being adapted to receive a storage battery and said end walls being engageable with said battery, a housing receiving said frame and battery and urging the end walls of the frame into engagement with the battery whereby said battery will be limited against outward movement from the frame and housing, and means carried by the housing and engageable with the frame for normally preventing outward movement of the frame from the housing.

4. In a battery container, a frame formed from a single blank of sheet metal and having resilient end walls terminating in beads adapted to overhang the ends of a storage battery, said end walls being curved inwardly to engage the battery and prevent endwise movement thereof in the frame, said frame having side flanges preventing lateral movement of the battery, a housing adapted to receive the frame and storage battery and automatically urging the end walls into engagement with the battery as the frame is moved into the housing, said beads being disposed in overhanging relation to the ends of the battery for preventing outward movement thereof from the frame, and a latch carried by the housing and limiting outward movement of the frame from the housing.

5. In a battery container, a sheet metal frame having resilient end walls and side flanges, said frame being adapted to receive a storage battery and said end walls and flanges serving to limit shifting movement of the battery in the frame, said end walls having inwardly rolled beads and being normally sprung slightly outwardly, openings formed in the end walls, a housing adapted normally to receive the battery and frame and having end walls engageable with the end walls of the frame for moving said end walls inwardly as said frame is moved into position in the housing whereby said beads will be caused to overlap the ends of the battery and prevent displacement thereof from the housing and frame, said housing having cut away portions in its end walls, and latches carried by the housing and engageable through said cut away portions and said openings for normally limiting the frame and battery against outward movement from the housing.

6. In a battery container, a frame having end walls provided with laterally directed fingers adapted to overlie the ends of a storage battery and normally preventing outward movement of the battery, said end walls having outwardly bowed portions, and a housing receiving the frame and engaging said outwardly bowed portions for retaining the frame in close engagement with the battery, said battery and frame being mounted in operative position in said housing.

7. In a battery container, a frame having end walls provided with laterally disposed fingers adapted to normally overhang portions of a storage battery, said end walls having latches thereon, said latches being formed with latch bolts, a housing adapted to receive the frame and battery and retaining the end walls of said frame in operative position about said battery with the lateral fingers overhanging the ends of the battery, and means formed in the housing for engagement by the latch bolt for retaining the frame and battery in operative position within the housing.

8. In a battery container, a frame having a bottom, side flanges, and end walls, said end walls having laterally disposed fingers and overhanging latch casings, said fingers and latch casings being adapted to normally overhang the ends of a storage battery for preventing displacement of said battery from the frame, said latch casings having latch bolts, and springs normally urging said latch bolts outwardly endwise of the casings, and a housing normally receiving the frame and battery and retaining the frame in operative position about the battery, said housing having openings removably receiving the latch bolts whereby said frame and battery will be locked in operative position within the housing, said latch bolts being retractable for permitting removal of the frame from the housing and consequent removal of the battery from the frame.

FRANKLIN M. MARTINO.